(12) United States Patent
Evans et al.

(10) Patent No.: US 8,160,979 B1
(45) Date of Patent: Apr. 17, 2012

(54) METHOD AND APPARATUS FOR PROVIDING A VIRTUAL SERVICE AGENT THAT RECEIVES QUERIES, COMPARES QUESTIONS TO A SET OF QUERIES, AND ALLOWS A USER TO CONFIRM A CLOSEST MATCH

(75) Inventors: David Evans, Los Altos Hills, CA (US); Drew Thomas Burns, Pleasanton, CA (US); Edward Thaddeus Michael Miller, San Francisco, CA (US); Paul Hewitt, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1232 days.

(21) Appl. No.: 11/613,830

(22) Filed: Dec. 20, 2006

(51) Int. Cl.
*G06F 17/00* (2006.01)

(52) U.S. Cl. ........................................................ 706/45

(58) Field of Classification Search .............. 706/45–48, 706/12
See application file for complete search history.

(56) References Cited

U.S. PATENT DOCUMENTS

| | | | | |
|---|---|---|---|---|
| 7,263,183 B1* | 8/2007 | Klein et al. | ............. | 379/265.09 |
| 7,593,904 B1* | 9/2009 | Kirshenbaum et al. | ......... | 706/12 |
| 7,774,189 B2* | 8/2010 | Bar-Or et al. | ................... | 703/21 |
| 2001/0039562 A1* | 11/2001 | Sato | .............................. | 709/202 |
| 2003/0115170 A1* | 6/2003 | Turner et al. | ....................... | 707/1 |
| 2004/0117352 A1* | 6/2004 | Schabes et al. | ................... | 707/3 |
| 2006/0235696 A1* | 10/2006 | Bennett | ....................... | 704/270.1 |
| 2007/0094032 A1* | 4/2007 | Bennett et al. | ............. | 704/270.1 |
| 2007/0138268 A1* | 6/2007 | Tuchman | ....................... | 235/383 |
| 2010/0030734 A1* | 2/2010 | Chunilal | ........................... | 707/3 |

OTHER PUBLICATIONS

Kan, Web Page Categorization without the Web Page, 2004, ACM, WWW2004, May 17-22, 2004, New York, pp. 262-263.*
Trice et al., Consensus Knowledge Acquisition, 1989, MIT AI Lab, pp. 1-25.*
"Bot At Your Service Is it live? or is it Eve?," neale-may, Hi-Torque Marketing, Media Exposure and Publicity, http://www.nealemay.com/newsroom/Exposure_Verticals.ASP., pp. 1 and 28 of 1-29, Oct. 24, 2000.
"First Complete Virtual Agents Available Via Kiwilogic-Pulse Partnership," Press Release Abstract, 1 page, Nov. 11, 2002, PR Newswire, New York, N. Y., USA.

* cited by examiner

*Primary Examiner* — David Vincent
(74) *Attorney, Agent, or Firm* — Weaver Austin; Villeneuve & Sampson LLP

(57) ABSTRACT

A virtual agent is disclosed. The virtual agent may receive a question from a user, and compare the question against a list of queries contained in a database. The virtual agent may then assign a point value to the question, determine which of a set of ranges the point value matches, and perform an action responsive to which of the ranges the point value matches. The virtual agent is self-learning in that when a question is unanswerable, the virtual agent may seek out answers and store answers for future reference. Multiple virtual agents may be networked, creating a self-scaling pool of knowledge.

30 Claims, 9 Drawing Sheets

METHOD AND APPARATUS FOR PROVIDING A VIRTUAL SERVICE AGENT THAT RECEIVES QUERIES, COMPARES QUESTIONS TO A SET OF QUERIES, AND ALLOWS A USER TO CONFIRM A CLOSEST MATCH

FIELD OF THE DISCLOSURE

The present disclosure relates generally to providing a virtual service agent interface for users of a network.

BACKGROUND

Information is growing rapidly as evidenced by the ever-increasing amount a web pages. For example, the entire content of the Web doubled this year, and is expected to increase five-fold over the next two years. While the amount of content and information is staggering, getting to desired content can be a difficult and frustrating task.

As the content of the public Internet grows, so does the internal content of enterprise Intranets. Many companies have on-line sources for benefits and other resources available to employees. One example is that of Human Resources (HR).

However, presently existing interfaces are often troublesome. In many cases, an employee may not even know how to frame the proper question in the context of a standard search query. Ultimately, the employee may get frustrated enough to pick up the phone and ask the question directly to HR staff, thus rendering the effort to create the on-line presence a waste.

Recently, some companies have attempted to bring intelligence to their online presences. "Virtual people" have begun to appear on web sites that "speak" in response to the user's input. However, one drawback of present systems is that they suffer from the fact that they access a very limited pool of information that is static in nature, and do not scale as new information becomes available. Furthermore, they are not intelligent in that they do not learn from past interactions.

DETAILED DESCRIPTION

Overview

Figure 1:
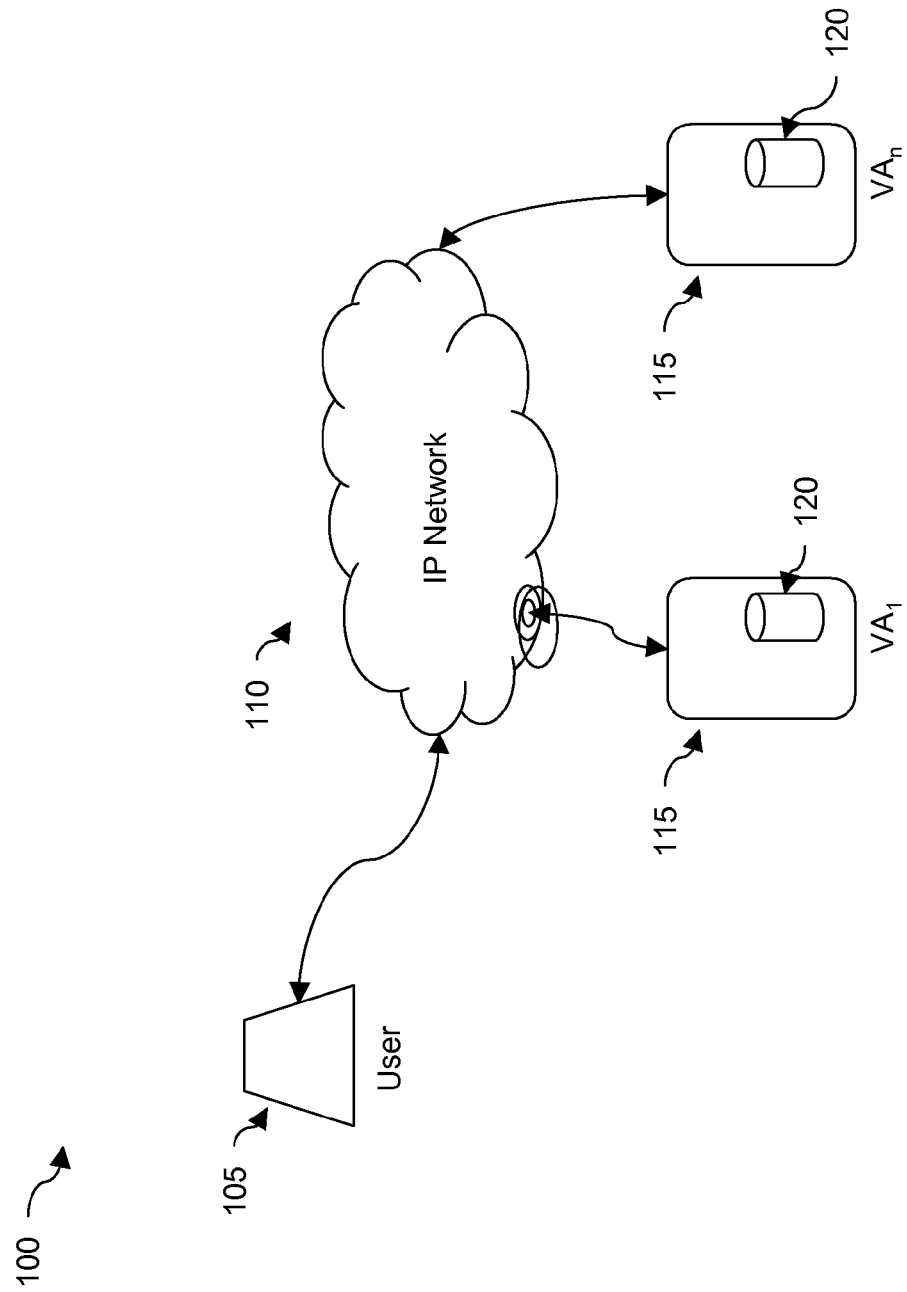
FIG. 1 is a functional block diagram of a system for providing a virtual service agent interface.

In accordance with this invention, a virtual agent is disclosed. The disclosed virtual agent may receive a question from a user, and compare the question against a list of queries contained in a database. The disclosed virtual agent may then assign a point value to the question, determine which of a set of ranges the point value matches, and perform an action responsive to which of the ranges the point value matches. The disclosed virtual agent is self-learning in that when a question is unanswerable, the virtual agent may seek out answers and store answers for future reference. Multiple versions of the disclosed virtual agents may be networked, creating a self-scaling pool of knowledge.

Embodiments of the present invention described in the following detailed description are directed at virtual agents. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The present disclosure provides for a virtual interface that guides a user to useful knowledge by interacting with the user in a human-like fashion while gathering information from one or more back-end systems. The virtual agent may be presented through a human-like interface. The virtual agent receives input in the form of textual input, parses the input, and provides answers or suggestions in response to the input. The virtual agent is fully programmable, including its personality and presentation style.

To help guide the user to useful information, the database from which the virtual agent draws is programmed with intelligence. For example, the system can process 'aliases' of HR terms, such as understanding that 'vacation time' is the technical equivalent of 'personal time off'. If the system does not understand a particular term, the system is programmed to prompt the user with related terms or other suggestions to help flush out the issue.

In further embodiments, the disclosed system may link, or string together, multiple virtual agents. In the context of an HR issue, often HR issues overlap with other departments, such as legal. For example, if a user asks a question regarding pregnancy leave, the HR virtual agent may not have the appropriate knowledge base. The present disclosure provides for the HR virtual agent to query a resource associated with the legal department, such as a virtual legal interface. If the legal resource returned an answer, the HR virtual agent would then provide the information to the user, without the user even being aware of the multiple-layers of queries behind the scene.

If the legal resource is unable to provide an answer, then it may either direct the HR virtual agent to a further virtual agent, or to a real person that has been designated as a resource for the particular matter. Once an answered is found, the system will to store the answer to the query, and provide the answer in response to similar questions in the future.

Thus, the disclosed system is self-learning, and can self-scale as more virtual agents are linked together.

Referring now to FIG. 1, a functional block diagram of a system 100 for providing a virtual service agent interface is shown. FIG. 1 includes a user 105 coupled to an IP-compliant network 110, such as the Internet or a corporate intranet or extranet. FIG. 1 also includes one or more virtual agents 115, shown as $VA_1$-$VA_n$.

The virtual agent can be displayed in virtually any GUI. For example, the virtual agent may be provided as a web interface a PC based client application, a PDA, etc. In one preferred embodiment, the virtual agent is provided using a character provided by Hapteck (www.haptek.com) for the visual representation.

In embodiments of this disclosure, the VAs may include a local copy 120 of a question and answer database as will be more fully discussed below. Alternatively, the database may be hosted on a central server and accessible through the network 110. The databases of this disclosure may include database queries ("DQ") that may be stored in a non-free-form structured format.

The database contains a list of questions that may have several types of information liked together. For example, the questions will have potential answers and appropriate emotional responses for the VA to answer with. Off-site resources may be linked, as well as other resources to search if the VA is unable to answer. The database uses a "fuzzy" matching algorithm that ranks the question based on how the permutation of the question compares with the database's queries. As will be more fully disclosed below, if the entered query exceeds a certain threshold, the system assumes that the entered question is an analogue of the stored question, and provides the stored information.

Figure 2A:
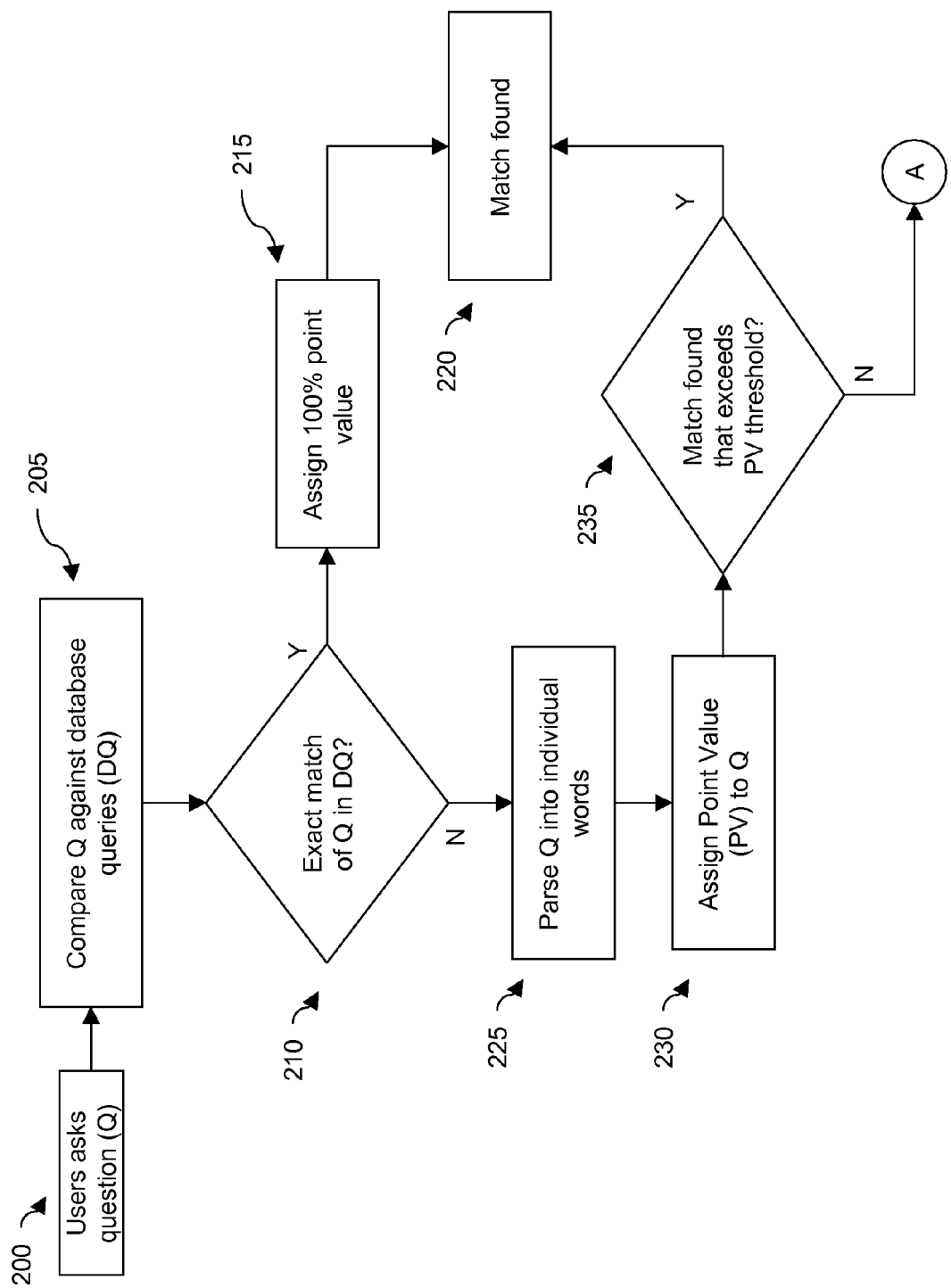
FIGS. 2A-B are flow diagrams of a query matching algorithm in accordance with the teachings of this disclosure.
Figure 2B:
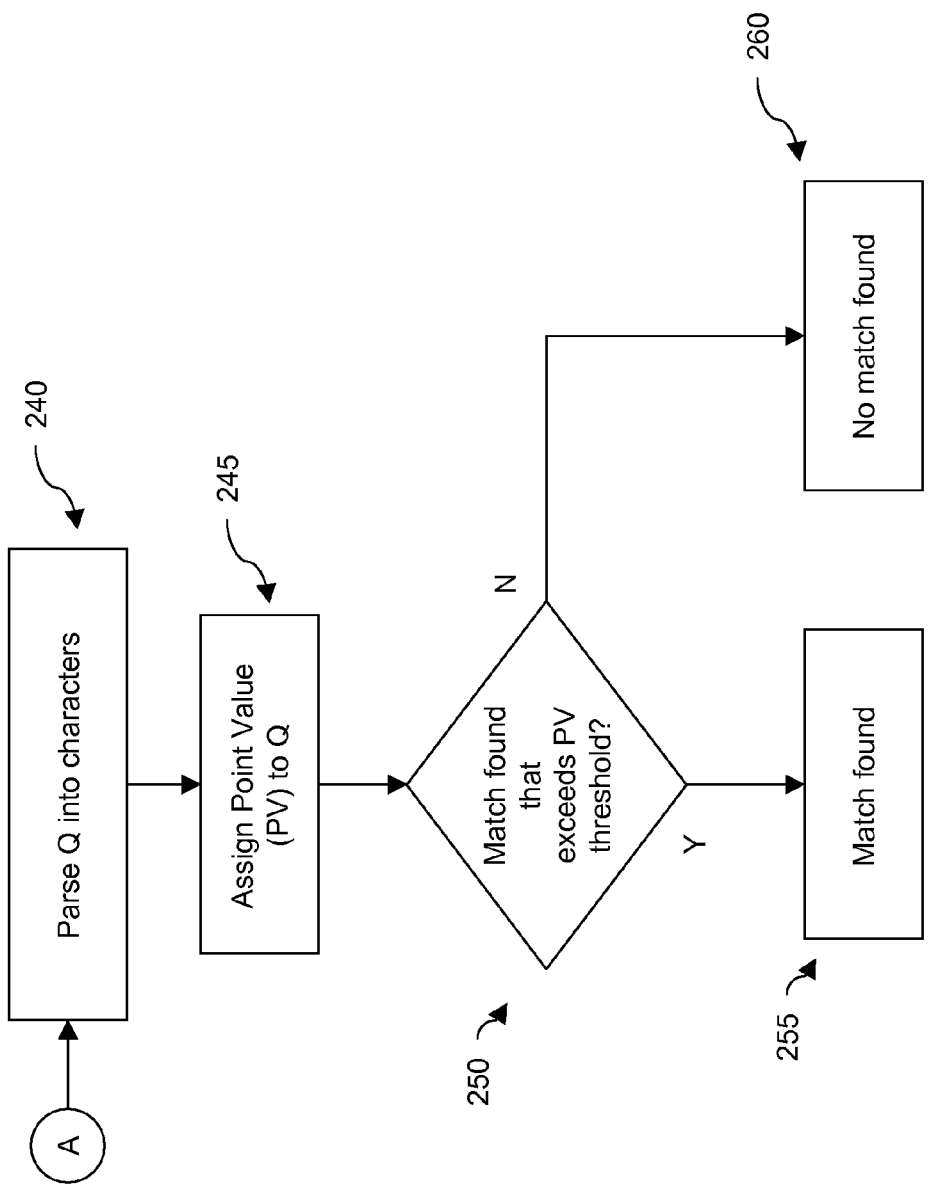

FIGS. 2A-B are flow diagrams of one embodiment of a query matching algorithm in accordance with the teachings of this disclosure.

The process begins in act 200, where the user inputs a question (Q) to the VA. For example, the user may ask an HR virtual agent "Does the company have a 401(k) plan?". The VA then compares the Q against a database of queries (DQ) in act 205.

The application then iterates through the question database looking for a match for Q in query 210. The application examines question Q against each database stored question "DQ". The application may convert both Q and DQ to uppercase to standardize comparison strings.

If an exact match is found, the application assigns a 100% point value (PV) in act 215, and a match is declared, and the process ends in act 220.

If no match is found, then the application parses the question Q into individual words in act 225. The application goes through each word in Q and compares against a candidate DQ, assigning a point value. If the currently examined word in Q exactly matches the currently examined word in DQ, it is assigned a point value of 100%

In query 235, the application determines whether the point value assigned to the words set exceeds a predetermined threshold. For example, in one embodiment, a threshold value of 90% is used. For example, if a query contained 10 words and 9 were found in a stored question contained in the database, the application would consider a match to be found.

If a match is determined to be found in query 235, the process ends in act 220.

If the point value threshold is not exceeded in query 235, the process then moves to act 240 of FIG. 2B.

If the currently examined word in question Q does match the currently examined word in DQ, the word is then decomposed into individual characters, and the same algorithm disclosed above is applied, comparing character by character, instead of word by word.

For example, the word "Does" is broken up into the characters D+O+E+S. Each of these characters in the word is then compared against each of the characters in a word in the DQ. If the characters match exactly it is assigned a point value of 100%. The point value score will proportionally less for each letter in the word Q not found in the DQ.

The application stores the result of the string comparison as "High Score" in act 245. It continues to iterate through all known DQ questions replacing the High Score if a better match is found in query 250.

If High Score >a given threshold (i.e., 90% in one embodiment as disclosed above), a match is considered to be found in act 255. If the High Score <a given threshold, a match is considered to be not found in act 260.

It is contemplated that situations may arise where a user enters a question Q that no certain match exists in the DQ database. However, a match may exist that falls just below the first threshold mentioned above, i.e., a point value of 85% may be found. In further embodiments, it is desired to flag such conditional matches to the user as such a result may be cause by a misspelling or mis-phrasing of the question by the user. Additionally, it is desired to seek input when no match is found.

Figure 3:
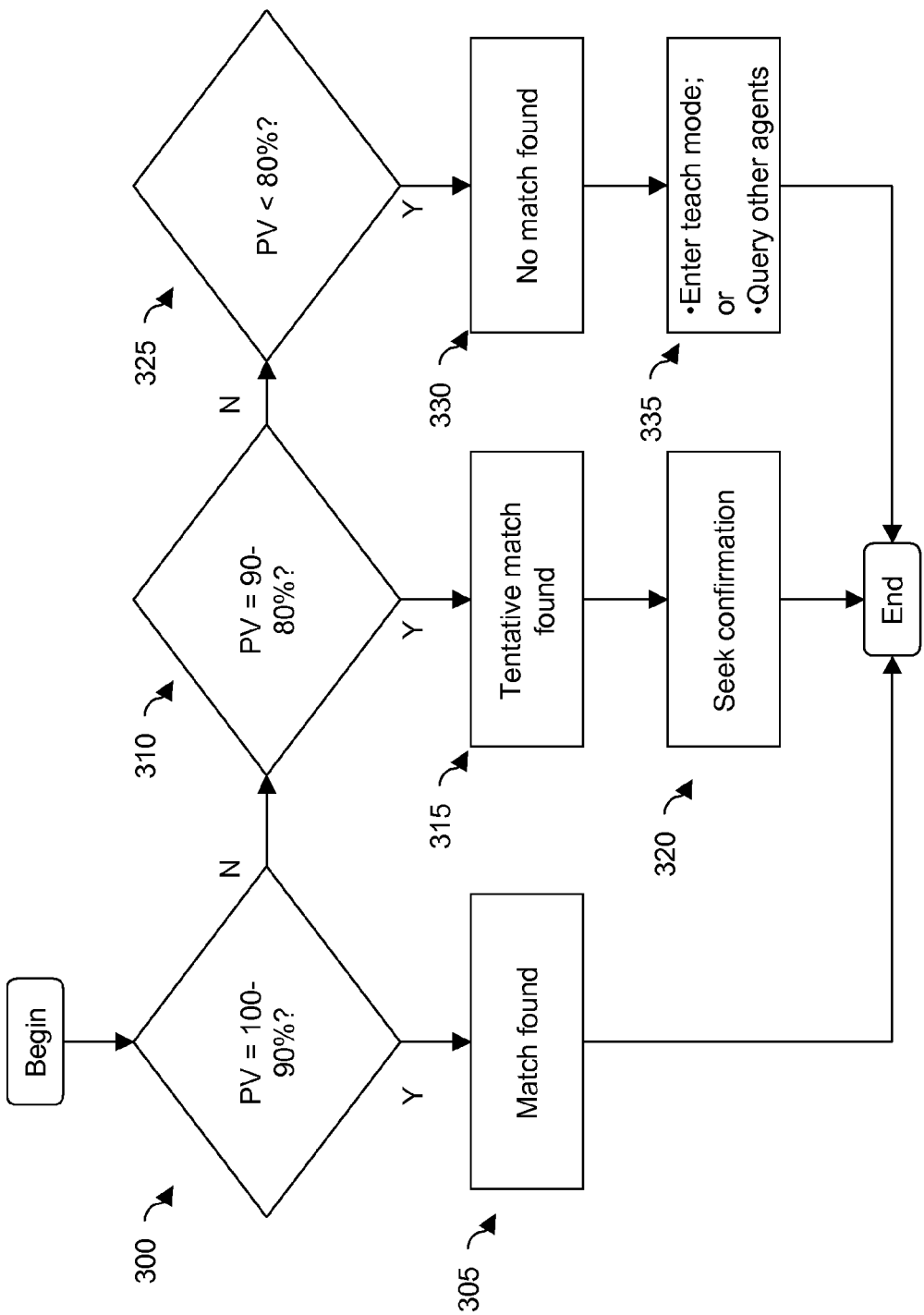
FIG. 3 is a flow diagram of a decision tree for handling such conditional matches.

FIG. 3 is a flow diagram of one embodiment of a decision tree for handling such conditional matches. In the following example, certain exemplary point value threshold levels are disclosed, however, it is to be understood that these thresholds can be varied for particular applications.

The process begins in query 300, where it is determined whether the response of a query returns a result above a first threshold. In this example, the threshold is illustrated as 90%. If the threshold is exceed, a match is found in act 305 in a manner as disclosed above.

If the point value does not exceed the first threshold, the process moves to query 310, where it is determined whether the assigned point value falls below the first threshold, but above a second threshold. In the embodiment disclosed in FIG. 3, the assigned point value is examined to determine whether it is between 90-80%.

If the assigned point value falls between the two thresholds, a conditional or tentative match is declared in act 315. As mentioned above, a tentative match may result from a misspelling and omission of a term from a question. In such a case, in one embodiment, the stored query representing the tentative match is presented to the user and, in act 320, the application queries the user seeking confirmation of whether the tentative match is indeed what the user intended to enter.

If the assigned point value falls below the second threshold in query 325, no match is found in act 330. In this case, it is desired to have the virtual agent perform one of a number of options in act 335 to acquire the correct information for future queries.

In the event a user enters a question (Q) and the application does not have a match for it as described above, a training mode may be enabled, and the application could take one of several actions to learn an answer to a question.

In one embodiment, when no match is found, the virtual agent queries other virtual agent resources. Referring back to FIG. 1, $VA_1$ may forward a query to which it does not know an answer to any one of other VAs resident on the network 110. It is contemplated that $VA_1$ may contact a central server to which all VAs are in communication. The central server may then forward the query to the most appropriate virtual agent.

For example, the central server may examine the query for keywords that can indicate the most likely virtual agent to have an answer.

In a further embodiment, each virtual agent may have a local copy of a list of target virtual agents and a protocol for targeting a specific virtual agent with a given query. Such a protocol may be used to generate a target list based upon subject matter category and keywords found in a query.

To communicate with other virtual agents, it is contemplated that the virtual agents may be configured to communicate using an Instant Messaging (IM) protocol as is known in the art. To insure security, a private IM network may be employed, or any one of a number of publicly available IM systems may be employed. Using an IM protocol, an ad-hoc network of virtual agents may be created. When one virtual agent requires assistance with a query, a message containing the query may be broadcast to one or more other virtual agents active on the IM system. In such a system, a query may be directed to one or more specific virtual agents. Alternatively, a query may be directed as a broadcast message to all virtual agents active on the IM network at any given time.

It is contemplated that when a message containing a query is received by a virtual agent, it will process the query using the algorithm disclosed above. Thus, if a match is found, the queried VA will reply with the correct answer to the asking VA. The asking VA will then pass along the answer to the user who asked the question. Note that this process can proceed in a manner completely transparent to the user.

Likewise, if the queried VA finds a conditional answer, the queried VA may reply to the asking VA with a confirmation request. The asking VA can then ask the user for confirmation, and pass back the user's input to the queried VA, and so on. If no match is found, the second VA may query other Vas, or issue a broadcast query. When the user is satisfied with the answer, all virtual agents may then update their databases with the correct information for future use. In such a fashion, the disclosed system becomes a self-learning ad-hoc system of virtual agents. Alternatively, a central database may be updated.

It can thus be seen that the virtual agents of this disclosure may assign a point value to a received query, and then perform a variety of actions based upon which of a plurality of predefined ranges the point value matches. In the examples disclosed herein, a finding of a match, a tentative (or conditional) match, or a failure to find a match result in the virtual agent performing a number of functions responsive to the type of match found. It is to be understood that other ranges and associated match types may be defined without departing from the scope of this disclosure.

It is contemplated that there may be queries that the system of virtual agents can not answer. In such cases, it may be desirable to query a known human resource. In one embodiment, the virtual agent may use an IM application to message a human resource with the query. The human resource's answer may then be provided to the user and stored for future use.

It is contemplated that the virtual agents of this disclosure may also send a structured electronic document (e-mail, delimited text file, etc) to a known user on the network. It could do this via standard internet protocols such as SMTP/socket communication. The virtual agent may wait for a response also in a structured format, parse this response, and then store if for future reference.

Referring back to FIG. 3, another disclosed option is to enter a "teach mode" and interact directly with a user. In one embodiment, the user may simply supply the answer. In further embodiments disclosed below, a user may teach the virtual assistant where to find the information.

FIGS. 4A-F are screenshots of a virtual agent operating in accordance with the teachings of this disclosure.

Figure 4A:
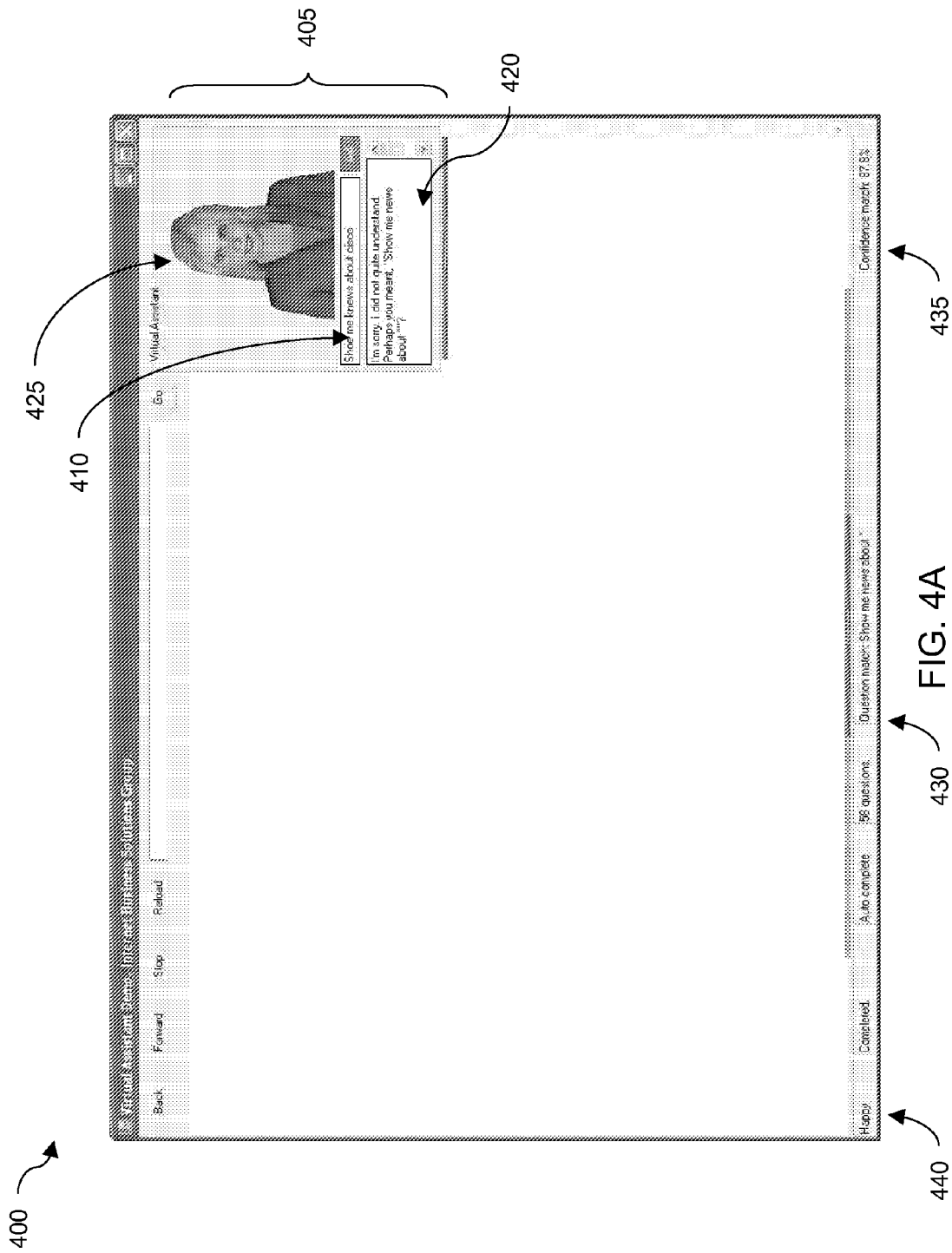
FIGS. 4A-E are screenshots of a virtual agent operating in accordance with the teachings of this disclosure.

FIG. 4A shows a screenshot of a browser window 400. FIG. 4A also shows a virtual agent 405 operating in a window floating over the browser 400. The VA 405 also includes a question input area 410 and an answer area 420 where the VAs answer appears. The VA 405 also may include an animated avatar character 425. It is contemplated that the avatar 425 may be animated and configured to speak the results appearing in the answer window 420.

In the example of FIG. 4A, a user is seeking news regarding Cisco Systems, the assignee of the present application. However, the query entered in the question box 410 is misspelled as "Shoe me knews about Cisco". The match is shown as being 87.8% in the result area 435. Using the parsing algorithm of this disclosure, the result comes back in between the two thresholds as described above, resulting in a tentative match for "Show me news about Cisco".

As a result of the tentative match, the virtual agent prompts the user with the closest match "Show me news about Cisco", and asks for confirmation from the user in the answer box 420.

Figure 4B:
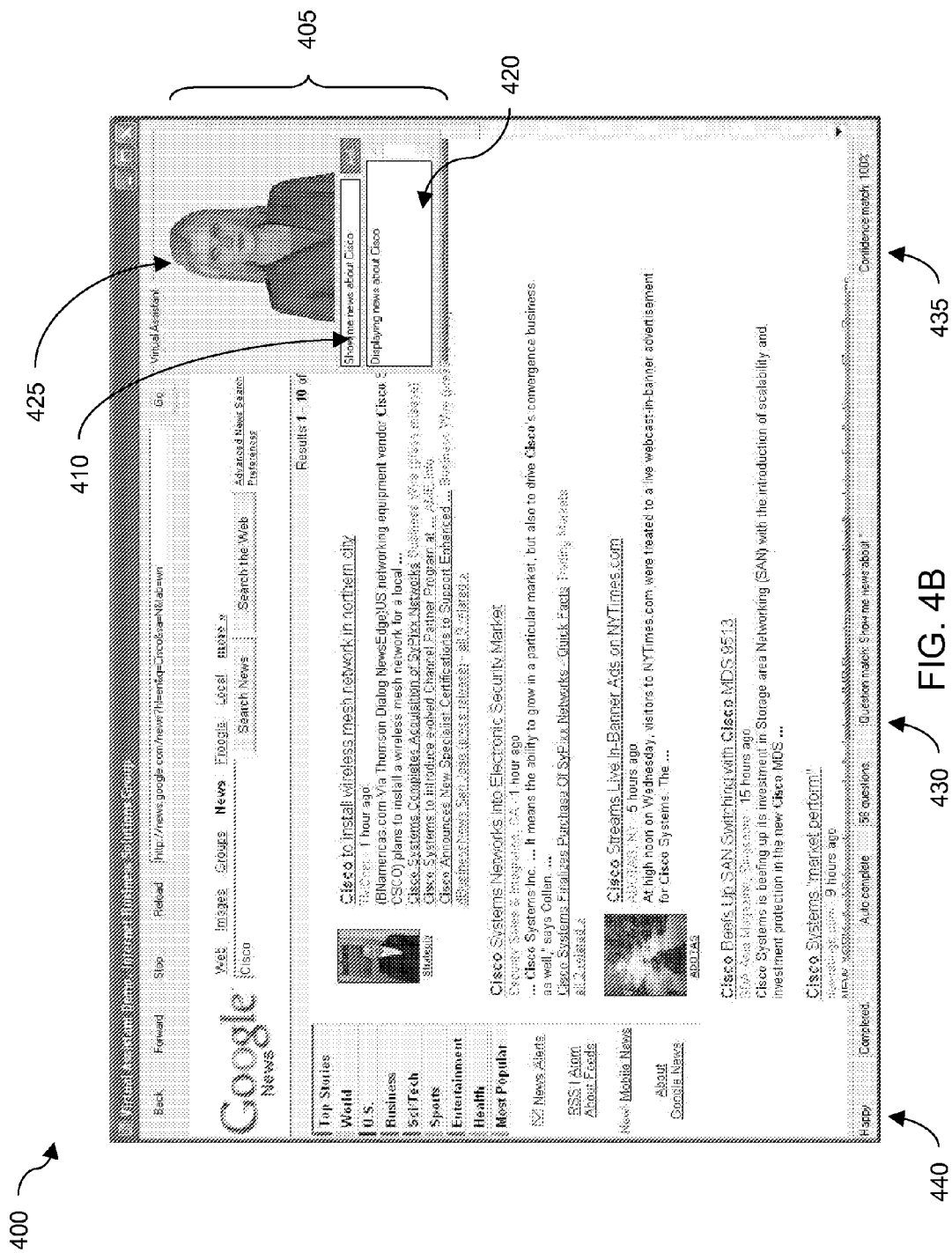

In FIG. 4B, the user then corrects the query as suggested, resulting in a match for the question "Show me news for *" as indicated in the status bar in area 430. As a result, in this case the browser is pointed to the Google News page and search is performed on the parameter "Cisco" that is passed to the page as a result of the query.

The match is shown as having a confidence match of 100% in area 435. It is contemplated that virtual agents may exhibit moods responsive to the interaction with the user; in this case the agent is happy with the perfect match, as shown in area 440. The mood may be reflected in the expressions of the avatar's face, or also in the tone of the avatar's voice.

Figure 4C:
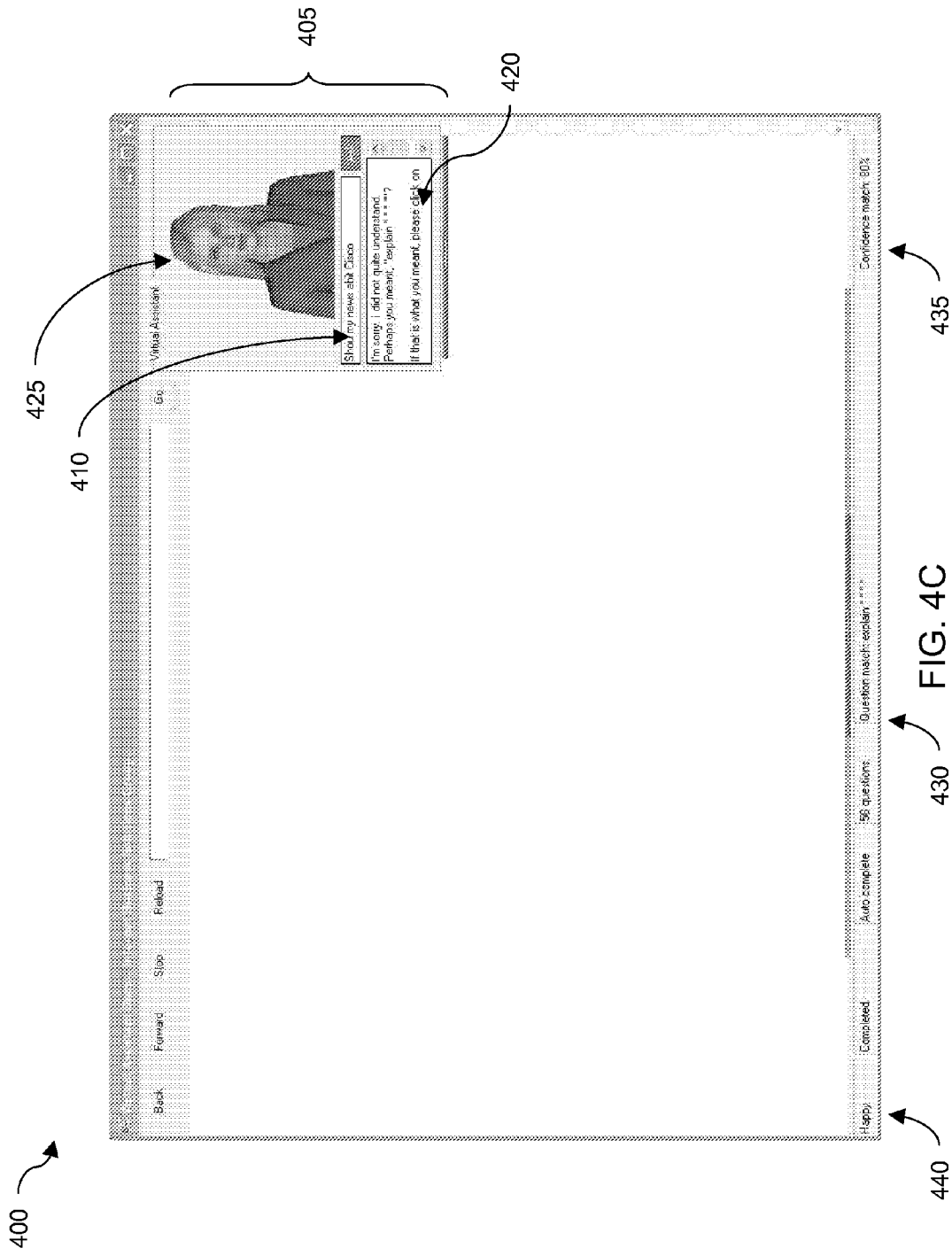

By way of comparison, FIG. 4C shows a query "Shou my news abit Cisco" that produces no match. In this case, with no match or tentative match found, the virtual agent responds with "I'm sorry. I did not quite understand. Please try again.". As can be seen from FIG. 4C, the result is shown as being 80% in area 435.

Figure 4D:
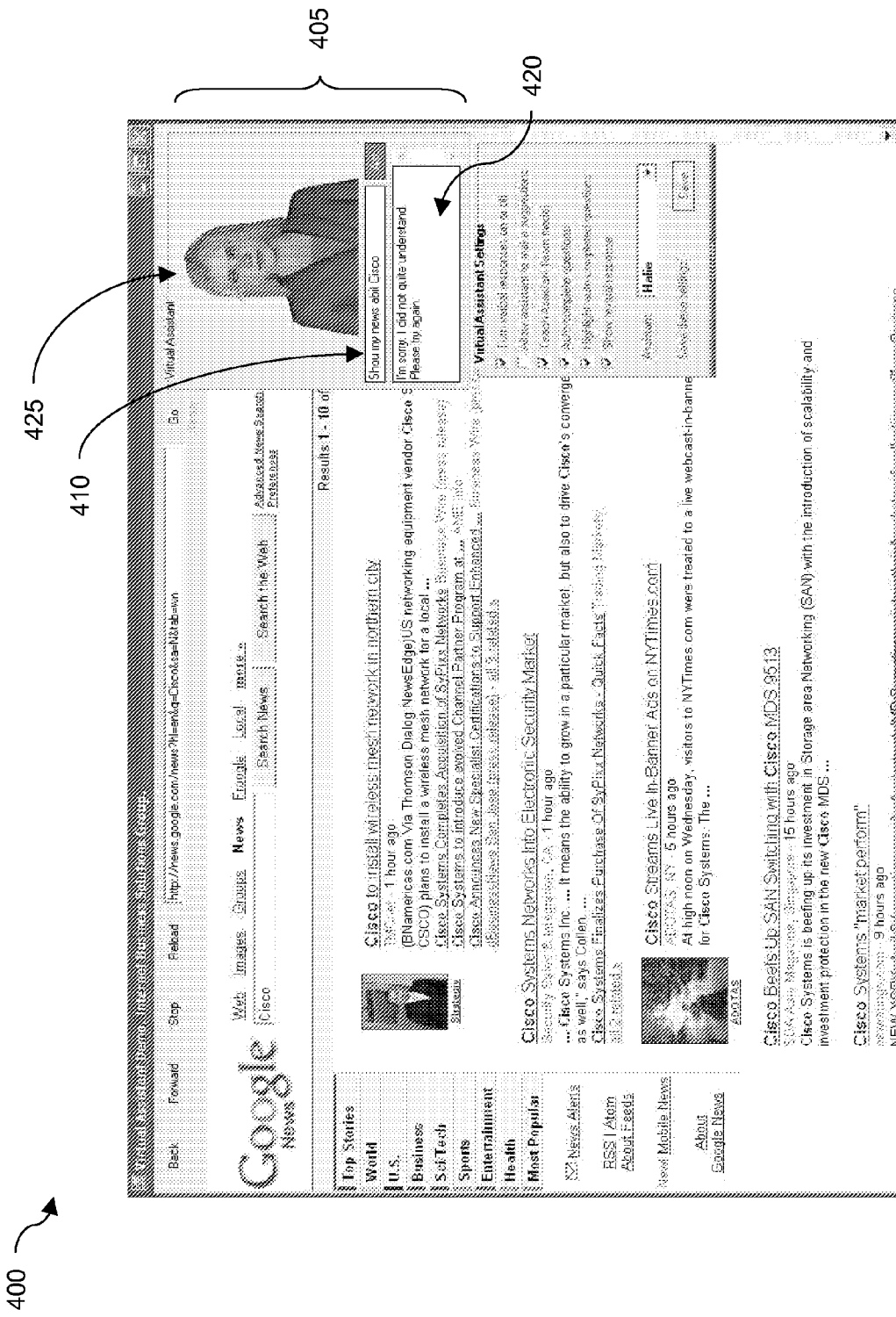

As mentioned above, it is desired to obtain answers to unknown questions in an effort to self-learn and grow the system. FIG. 4D show a screen shot of the virtual agent entering a teach mode. It is contemplated that the virtual agent may automatically entered a teach mode when a teach flag is set as a result of an unanswerable question, or the user may invoke a teach mode to program new features into the virtual agent.

In the example of FIG. 4D, a preferences window 445 drops from the agent 405.

Figure 4E:
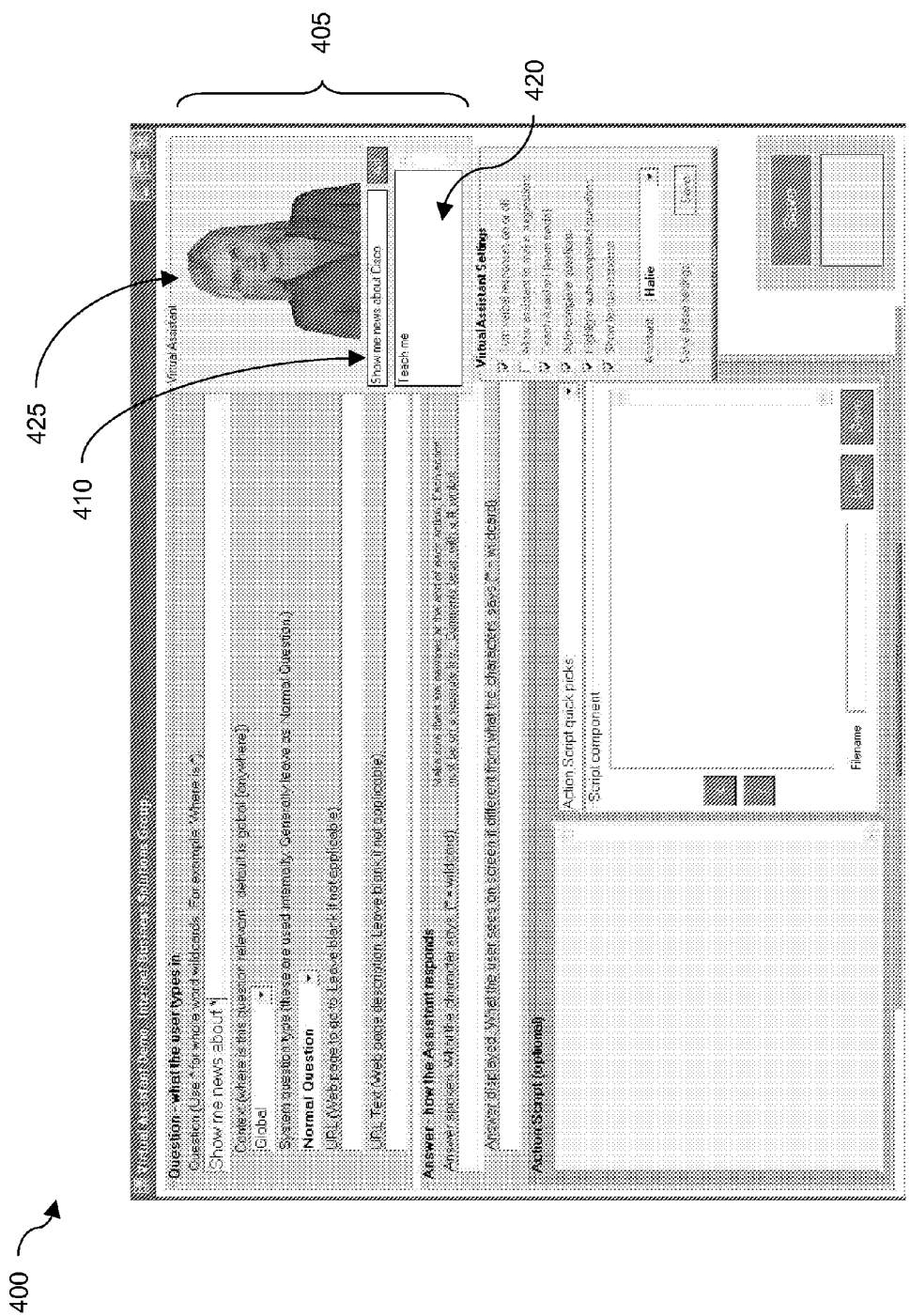

FIG. 4E is a screenshot of a virtual agent in a teaching or learning mode in which the virtual agent is programmed to answer a question. In this case, the virtual agent is programmed to respond to the question "Show me news about *", where the "*" character represents a wildcard character.

In one embodiment, the virtual agent may be programmed to respond to such a question by accessing information found on the Internet. In such a case, the virtual agent may search for news about the parameter passed to it through the wildcard character, and present the user with a page containing the desired content.

In a further embodiment, multiple web sites may be accessed to form a response to a pre-programmed query. For example, the virtual agent may be configured to answer the query "Show me the stock price of *". In this case the virtual agent must first convert the wildcard character to a stock ticker symbol on a first web site, then enter the ticker symbol into a page to retrieve the current stock price from a second web site.

However, it is not guarantied that the desired information will always be located in the same location on a particular web site as sites are updated often. To overcome this challenge, the virtual agents of this disclosure may be configured to examine the HTML source code to retrieve desired information. In this example, the virtual agent is preprogrammed with the delimiters that surround the content to be retrieved. When a query is entered, the virtual agent then accesses the web site and retrieves the HTML code for the particular page that contains the desired information (i.e., the current stock price). The virtual agent will then parse through the code, looking for the delimiters. When the delimiters are found, the information contain between the delimiters is returned to the user as an answer to the query.

It is contemplated that the parsing algorithms as disclosed above may be employed to identify the delimiters. By operating in such a fashion, the search for the delimiters will operate in a more reliable manner, and will be flexible enough to still return accurate results in the face of minor site changes in formatting and the like.

As can be seen, the virtual agents of this disclosure may perform many functions in a manner transparent to the user. The virtual agents may access content on the Internet, or extract URLs and locate content. The virtual agents may also be configured to perform transactions and exchange information between systems that employ a standard interface or API. For example, the virtual agent may be configured to set up meeting for a user in an enterprise that uses a calendaring system that the virtual agent can interact with using the algorithms disclosed herein.

In such an example, the user may enter the request "Set up a meeting with Bob Smith next Wednesday". In response, the virtual agent may examine the user's contacts, extract the email for Bob Smith, and send an email (or instant message, if desired) to the email address with a message asking for Bob Smith's availability. The virtual agent may then parse the response, looking for delimiters that are common in such responses. The date and time may then be extracted from the response, and an event created in the calendaring system, all done transparently to the user.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

We claim:

1. An apparatus comprising:
   a processor;
   a memory; and
   a virtual agent programmed to:
   receive a question from a user;
   compare the question against a set of queries in a database, the database being associated with the virtual agent;
   assign a point value to each of the set of queries that indicates whether the corresponding one of the set of queries matches said question;
   identify one of the set of queries that is a closest match to said question based upon the point value that has been assigned to each of the set of queries;
   determine to which of a set of ranges the point value of the closest match corresponds, wherein a first one of the set of ranges indicates that a match to the question has been found in the set of queries in said database, wherein a second one of the set of ranges indicates that a tentative match to the question has been found in the set of queries in said database, and wherein a third one of the set of ranges indicates that no match to the question has been found in the set of queries in said database; and
   perform an action responsive to which of the ranges the point value of the closest match corresponds such that, when the point value of the closest match corresponds to the second one of the set of ranges, the virtual agent presents the closest match found back to the user and seeks confirmation that the closest match matches the question, wherein when the user confirms that the closest match matches the question, the closest match is treated as a match to the question.

2. The apparatus of claim 1, wherein the virtual agent comprises a computer-based interface including an avatar that interacts with a user through a human like interface.

3. The apparatus of claim 1, wherein the virtual agent is networked to at least one other virtual agent, and said virtual agent is programmed to present said question to the at least one other virtual agent in the case that no match to said question is found by said virtual agent in said database.

4. The apparatus of claim 3, wherein said virtual agent is programmed to store an answer received from said at least one other virtual agent in said virtual agent's associated database.

5. The apparatus of claim 3, wherein the at least one other virtual agent is selected based upon the subject matter of said question.

6. The apparatus of claim 1, wherein the virtual agent is networked to a set of virtual agents, and said virtual agent is programmed to broadcast said question to the set of virtual agents in the case that no match to said question is found in said database by said virtual agent.

7. The apparatus of claim 1, wherein the virtual agent is networked to a set of virtual agents, and said virtual agent is programmed to provide said question to a selected human resource in the case that no match to said question is found in said database by said virtual agent, said selected human resource being selected by the subject matter of said question.

8. The apparatus of claim 4, wherein the virtual agent is programmed to access a web page to obtain information in response to said question.

9. The apparatus of claim 8, wherein the virtual agent is programmed to examine the source code of the web page to retrieve desired information.

10. The apparatus of claim 9, wherein the virtual agent is programmed to search for pre-defined delimiters contained in said source code that surround the desired information.

11. A method comprising;
   receiving, by a virtual agent, a question from a user;
   comparing the question against a set of queries in a database associated with the virtual agent;
   assigning a point value to each of the set of queries that indicates whether the corresponding one of the set of queries matches said question;
   identifying one of the set of queries that is a closest match to said question based upon the point value that has been assigned to each of the set of queries;
   determining to which of a set of ranges the point value of the closest match corresponds, wherein a first one of the set of ranges indicates that the closest match is a match to the question, wherein a second one of the set of ranges indicates that the closest match is a tentative match to the question, and wherein a third one of the set of ranges indicates that the closest match is not a match to the question; and performing an action responsive to which of the ranges the point value of the closest match corresponds such that, when the closest match is determined to be a tentative match to the question, the virtual agent presents the closest match found back to the user and seeks confirmation that the closest match matches the question, wherein when the user confirms that the closest match matches the question, the closest match is treated as a match to the question.

12. The method of claim 11, further comprising the act of networking to at least one other virtual agent and presenting said question to the at least one other virtual agent in the case that the closest match is not a match to said question.

13. The method of claim 12, further comprising the act of storing an answer received from said at least one other virtual agent in said virtual agent's associated database.

14. The method of claim 12, wherein said at least one other virtual agent is selected according to the subject matter of said question.

15. The method of claim 11, further comprising the act of broadcasting said question to a set of virtual agents in the case that the closest match is not a match to said question.

16. The method of claim 11, further comprising:
sending said question to a selected human resource in the case that the closest match is not a match to said question, said selected human resource being selected according to the subject matter of said question;
receiving a response from the selected human resource; and
parsing the response.

17. The method of claim 12, further comprising the act of accessing a web page to obtain information in response to said question.

18. The method of claim 17, further comprising the act of examining the source code of the web page to retrieve desired information.

19. The method of claim 18, further comprising the act of searching for pre-defined delimiters contained in said source code that surround the desired information.

20. A virtual agent comprising:
means for receiving by a virtual agent means a question from a user;
means for comparing the question against a set of queries in a database means;
means for assigning a point value to each of the set of queries that indicates whether the corresponding one of the set of queries matches said question;
means for identifying one of the set of queries that is a closest match to said question based upon the point value that has been assigned to each of the set of queries;
means for determining to which of a set of ranges the point value of the closest match corresponds, wherein a first one of the set of ranges indicates that a match to the question has been found in the set of queries in said database, wherein a second one of the set of ranges indicates that a tentative match to the question has been found in the set of queries in said database, and wherein a third one of the set of ranges indicates that no match to the question has been found in the set of queries in said database; and
means for performing an action responsive to which of the ranges the point value of the closest match corresponds such that, when the point value of the closest match corresponds to the second one of the set of ranges, the virtual agent presents the closest match found back to the user and seeks confirmation that the closest match matches the question, wherein when the user confirms that the closest match matches the question, the closest match is treated as a match to the question.

21. The virtual agent of claim 20, further comprising:
means for associating the virtual agent means with the database means.

22. The apparatus of claim 6, wherein the virtual agent maintains a list of the set of virtual agents.

23. The apparatus of claim 3, wherein said virtual agent is programmed to automatically present said question to the at least one other virtual agent in the case that no match to said question is found by said virtual agent in said database.

24. The apparatus of claim 1, the virtual agent being programmed to perform further steps, comprising:
when the user confirms that the closest match matches the question, presenting an answer corresponding to the closest match.

25. The apparatus of claim 1, the virtual agent being programmed to determine to which of a set of ranges the point value of the closest match corresponds by performing steps, comprising:
determining whether the point value of the closest match falls within the first one of the set of ranges; and
when it is determined that the point value of the closest match does not fall within the first one of the set of ranges, determining whether the point value of the closest match falls within the second one of the set of ranges.

26. An apparatus comprising:
a processor; and
a memory, the memory storing thereon computer-readable instructions that, when executed, cause the apparatus to implement a virtual agent by performing the following steps:
receive a question from a user;
compare the question against a set of queries in a database, the database being associated with the virtual agent;
assign a point value to each of the set of queries that indicates whether the corresponding one of the set of queries matches said question;
identify one of the set of queries that is a closest match to said question based upon the point value that has been assigned to each of the set of queries;
determine to which of a set of ranges the point value of the closest match corresponds, wherein a first one of the set of ranges indicates that a match to the question has been found in the set of queries in said database, wherein a second one of the set of ranges indicates that a tentative match to the question has been found in the set of queries in said database, and wherein a third one of the set of ranges indicates that no match to the question has been found in the set of queries in said database; and
perform an action responsive to which of the ranges the point value of the closest match corresponds such that, when the point value of the closest match corresponds to the second one of the set of ranges, the virtual agent presents the closest match found back to the user and seeks confirmation that the closest match matches the question, wherein when the user confirms that the closest match matches the question, the closest match is treated as a match to the question.

27. The method as recited in claim 11, further comprising: exhibiting a mood responsive to interaction with the user.

28. The method as recited in claim 11, further comprising:
in response to presenting the closest match found to the user when the closest match is determined to be a tentative match to the question, receiving confirmation from the user that the closest match matches the question;
in response to receiving confirmation from the user that the closest match matches the question, obtaining an answer to the tentative match, and providing the answer to the user.

29. The method as recited in claim 28, wherein in response to receiving confirmation from the user that the closest match matches the question, the method further comprising:
updating the database to indicate that the tentative match matches the question.

30. The method as recited in claim 11, wherein performing an action responsive to which of the ranges the point value of the closest match corresponds comprises at least one of searching the user's contacts, extracting an email address from the user's contacts, sending an email to an email address, parsing a response received from via email, or update a calendar.

* * * * *